(12) United States Patent
Seeman et al.

(10) Patent No.: US 10,878,322 B2
(45) Date of Patent: *Dec. 29, 2020

(54) HOME WIRELESS DISCOVERY

(71) Applicant: Resolution Products, LLC, St. Paul, MN (US)

(72) Inventors: Brian K. Seeman, Lakeville, MN (US); David J. Mayne, Eagan, MN (US); Paul G. Saldin, Stillwater, MN (US); Daniel Mondor, Somerset, WI (US)

(73) Assignee: Resolution Products, LLC, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,695

(22) Filed: Apr. 19, 2019

(65) Prior Publication Data

US 2019/0318250 A1   Oct. 17, 2019

Related U.S. Application Data

(63) Continuation of application No. 15/455,041, filed on Sep. 9, 2017, now Pat. No. 10,311,359.

(Continued)

(51) Int. Cl.
*G06N 5/02* (2006.01)
*G06N 5/00* (2006.01)
(Continued)

(52) U.S. Cl.
CPC ............ *G06N 5/022* (2013.01); *G06N 5/04* (2013.01); *H04L 12/2823* (2013.01);
(Continued)

(58) Field of Classification Search
CPC .......... G06N 5/022; G06N 5/04; G06N 20/00; G06N 3/08; H04W 4/38; H04W 4/33;
(Continued)

(56) References Cited

U.S. PATENT DOCUMENTS 6,624,750 B1   9/2003 Marman et al.
8,401,575 B2 *  3/2013 Fischer ............... H04W 72/005
                                                   455/412.1

(Continued)

FOREIGN PATENT DOCUMENTS

CN   101013976   8/2007
CN   101030902   9/2007

(Continued)

OTHER PUBLICATIONS

International Search Report and Written Opinion in International Application No. PCT/US17/21672, dated Jun. 1, 2017, 7 pages.

(Continued)

*Primary Examiner* — Ly D Pham
(74) *Attorney, Agent, or Firm* — Fish & Richardson P.C.

(57) ABSTRACT

In one implementation, a method for detecting a configuration of wireless sensors within a vicinity includes a method of assessing wireless sensors in the vicinity of an application computing system. The application computing system is operated in a listen mode to receive and record wireless transmissions produced by one or more wireless sensors producing wireless transmissions in the vicinity of the application computing system. The recorded wireless transmissions are evaluated using a rule set that embodies normal operating characteristics of various types of wireless sensors in an operating environment to generate a conclusion regarding at least one attribute of at least one wireless sensor that produced the recorded wireless transmissions. The generated conclusion can be used so that the at least one wireless sensor is utilized in the application computing system.

20 Claims, 10 Drawing Sheets

Related U.S. Application Data

(60) Provisional application No. 62/306,054, filed on Mar. 9, 2016.

(51) Int. Cl.

| | | |
|---|---|---|
| *G06N 3/08* | (2006.01) | |
| *H04W 4/00* | (2018.01) | |
| *H04W 4/70* | (2018.01) | |
| *H04W 4/80* | (2018.01) | |
| *H04W 4/38* | (2018.01) | |
| *H04L 29/08* | (2006.01) | |
| *G06N 5/04* | (2006.01) | |
| *H04L 12/28* | (2006.01) | |
| *H04W 4/33* | (2018.01) | |
| *G06N 20/00* | (2019.01) | |

(52) U.S. Cl.
CPC ............... *H04L 67/12* (2013.01); *H04W 4/33* (2018.02); *H04W 4/38* (2018.02); *H04W 4/70* (2018.02); *H04W 4/80* (2018.02); *G06N 3/08* (2013.01); *G06N 20/00* (2019.01)

(58) Field of Classification Search
CPC ...... H04W 4/70; H04W 4/80; H04L 12/2823; H04L 67/12
USPC ........................................................... 706/46
See application file for complete search history.

(56) References Cited

U.S. PATENT DOCUMENTS

| | | | | |
|---|---|---|---|---|
| 10,311,359 B2* | 6/2019 | Seemann | ............ | H04L 12/2823 |
| 10,621,139 B2* | 4/2020 | Hofstaedter | .......... | G06F 15/173 |
| 2002/0077077 A1 | 6/2002 | Rezvani et al. | | |
| 2008/0181130 A1 | 7/2008 | Balu | | |
| 2009/0138547 A1* | 5/2009 | Boudreau | ............. | H04L 67/303 |
| | | | | 709/203 |
| 2010/0304673 A1* | 12/2010 | Yoshizawa | .............. | H04L 69/24 |
| | | | | 455/41.2 |
| 2011/0191465 A1* | 8/2011 | Hofstaedter | .......... | G06F 15/173 |
| | | | | 709/224 |
| 2012/0036242 A1 | 2/2012 | Wittenburg et al. | | |
| 2012/0089299 A1 | 4/2012 | Breed et al. | | |
| 2013/0124736 A1 | 5/2013 | Park | | |
| 2013/0154558 A1* | 6/2013 | Lee | ....................... | H04B 5/0037 |
| | | | | 320/108 |
| 2013/0265158 A1 | 10/2013 | Bergman et al. | | |
| 2014/0062297 A1 | 3/2014 | Bora | | |
| 2014/0089143 A1* | 3/2014 | Dione | ................. | G06K 19/0723 |
| | | | | 705/26.61 |
| 2014/0133378 A1* | 5/2014 | Wentink | ............ | H04W 52/0235 |
| | | | | 370/311 |
| 2015/0005024 A1* | 1/2015 | Fudickar | .............. | H04M 1/7253 |
| | | | | 455/509 |
| 2015/0067816 A1 | 3/2015 | Rados | | |
| 2015/0178548 A1 | 6/2015 | Abdallah | | |
| 2016/0295397 A1* | 10/2016 | Nielsen | ................. | H04L 12/282 |
| 2016/0323972 A1 | 11/2016 | Bora | | |
| 2017/0079257 A1 | 3/2017 | Haensgen | | |
| 2017/0127155 A1 | 5/2017 | Zheng | | |
| 2018/0097830 A1 | 4/2018 | Shibata | | |

FOREIGN PATENT DOCUMENTS

| | | |
|---|---|---|
| CN | 101052345 | 10/2007 |
| CN | 101321180 | 12/2008 |
| CN | 102308073 | 1/2012 |
| WO | WO 2017/001928 | 1/2017 |

OTHER PUBLICATIONS

Extended European Search Report in Application No. 17764144.6, dated Aug. 16, 2019, 11 pages.

* cited by examiner

Configurable Sensor Attributes

Guessed/Concluded/Selected Attributes:

- Frequency of operation
- Protocol
- Manufacturer
- Encrypted or not
- Device Type
- Perimeter or interior location
- Mounting location
- Vintage of manufacture
- System responses
  - Name of sensor (Garage Overhead, Garage Interior, Front Door, etc....)
  - Group Number (GE/Interlogix)
  - System response settings
  - Perimeter or interior response
  - Behavior of system in certain arming levels in response to that sensor
    - Active in Stay vs. Away
    - Alarm response (report code, siren/silent)
  - Instant alarm / delayed alarm / follower (secondary after a primary sensor)

| Name | Inputs | Default Zone Profile |
|---|---|---|
| Door/Window | Reed | Entry/Exit Standard |
|  | External Input 1 | Perimeter |
|  | External Input 2 | Perimeter |
| NanoMax Door/Window Sensor | Reed/External | Entry/Exit Standard |
| PIR Motion Sensor | Motion Detected | Motion Follower |
|  | Reed/External | Interior |
| Panic Pendant | Panic | Panic |
| Tilt Sensor | Tilt Detected | Entry/Exit Long |
| Smoke Sensor | Smoke/head Detected | Fire |
| CO Sensor | CO Limit Reached | CO |
| Generic | Primary Alarm | Perimeter |
|  | Momentary Alarm | Interior |
|  | Secondary Input 1 | Interior |
|  | Secondary Input 2 | Interior |
| Glass Break | Glass break detected | Glass break |
|  | Reed Switch | Perimeter |
|  | External Input 1 | Perimeter |
| Home Disaster | Flood | Flood |
|  | Low Temperature | Environmental |
|  | High Temperature | Environmental |
| Temperature | Low Temperature | Low Temperature |
|  | High Temperature | Environmental |
| 8 Zone | External Input 1 | Perimeter |
|  | External Input 2 | Perimeter |
|  | External Input 3 | Perimeter |
|  | External Input 4 | Perimeter |
|  | External Input 5 | Perimeter |
|  | External Input 6 | Perimeter |
|  | External Input 7 | Perimeter |
|  | External Input 8 | Perimeter |

FIG. 4A

| Name | Description | Alarm Type | Siren Type | Active Levels | Delay | Supervised | Restoral | CS Report | Report Delay | Bypassable | Chime Open | Chime Close | Tamper | Low Battery | Follower | Auto Bypass |
|---|---|---|---|---|---|---|---|---|---|---|---|---|---|---|---|---|
| Fire | Fire, Heat, Smoke Sensor | Fire | Temp 3 | All | None | 2 | Yes | 1110 | No | No | No | No | Yes | Yes | No | No |
| Perimeter | Intrusion, Perimeter | Intrusion | Intrusion | Stay, Night, Away | None | 2 | Yes | 1131 | Yes | Yes | No | No | Yes | Yes | No | Yes |
| Entry/Exit Standard | Intrusion, Perimeter w/Standard Delay | Intrusion | Intrusion | Stay, Night, Away | Standard | 2 | Yes | 1134 | Yes | Yes | Yes | Yes | Yes | Yes | No | Yes |
| Entry/Exit Long | Intrusion, Perimeter w/Long Delay | Intrusion | Intrusion | Stay, Night, Away | None | 2 | Yes | 1134 | Yes | Yes | Yes | Yes | Yes | Yes | No | Yes |
| Interior | Intrusion, Interior w/No Delay | Intrusion | Intrusion | Away | None | 2 | No | 1132 | Yes | Yes | No | No | Yes | Yes | Yes | Yes |
| Interior Follower | Intrusion, Interior Follower | Intrusion | Intrusion | Away | Standard | 2 | No | 1132 | Yes | Yes | No | No | Yes | Yes | Yes | Yes |
| Motion | Intrusion, Interior Motion, No Delay, No Restoral | Intrusion | Intrusion | Away | None | 2 | No | 1132 | Yes | Yes | No | No | Yes | Yes | No | No |
| Motion Follower | Intrusion, Interior Motion, No Delay, No Restoral | Intrusion | Intrusion | Away | None | 2 | Yes | None | N/A | Yes | No | No | Yes | Yes | Yes | No |
| Trigger | Trigger zone for scenes | None | None | All | None | 2 | Yes | 1150 | No | Yes | No | No | Yes | Yes | No | Yes |
| Environ. | Environmental | Aux | Low Level | All | None | 2 | Yes | 1154 | No | Yes | No | No | Yes | Yes | No | Yes |
| Flood | High Water level | Aux | Low Level | All | None | 2 | Yes | 1159 | No | Yes | No | No | Yes | Yes | No | Yes |
| Low Temp | Low Temperature | Aux | Low Level | All | None | 2 | No | 1131 | Yes | Yes | No | No | Yes | Yes | No | Yes |
| Glassbreak | Intrusion, Glassbreak | Intrusion | Intrusion | Stay, Night, Away | None | 2 | Yes | 1131 | Yes | Yes | Yes | Yes | Yes | Yes | No | Yes |
| Special | Special Intrusion, Disarmed only in "special disarm" mode | Aux | Low Level | Disarmed, Stay, Night, Away | None | 2 | Yes | 1133 | Yes | Yes | No | Yes | Yes | Yes | No | Yes |
| CO | Carbon Monoxide | Life Safety | Temp 4 | All | None | 2 | Yes | 1162 | No | No | No | No | Yes | Yes | No | No |
| Supervised Only | Monitored for trouble conditions only | None | None | All | None | 2 | No | None | No | Yes | No | No | Yes | Yes | No | Yes |

FIG. 4B

HOME WIRELESS DISCOVERY

CROSS-REFERENCE TO RELATED APPLICATIONS

This application is a continuation of U.S. patent application Ser. No. 15/455,041 filed on Mar. 9, 2017, which claims the benefit of priority to U.S. Provisional Application Ser. No. 62/306,054, filed Mar. 9, 2016, entitled HOME WIRELESS DISCOVERY, the entire contents of which are hereby incorporated by reference.

TECHNICAL FIELD

This specification generally relates to wireless device discovery and identification, such as within a home.

BACKGROUND

In the developing connected and secure home, the services layer can garner value from the multitude of information coming from the multitude of sensors pre-existing or added in homes, buildings, and other locations. For example, at present many homes include multiple different sensors that transmit information about one or more components/systems within the homes, such as information indicating whether doors/windows are open or closed, motion sensor information, alarm status information, environmental information, and other information that sensors are capable of detecting. A large portion of installed sensors are wireless— meaning that they transmit at least some information wirelessly using one or more wireless protocols. The information from these sensors can have a variety of uses, such as being used to chart, classify and model consumer habits, initiate actions outside the home, automate devices and functions inside the home, and provide core security, life safety and home infrastructure monitoring and response.

Enrolling sensors with a third-party wireless system (e.g., a system not preconfigured to use or connect with particular sensors) can be a non-trivial operation. For instance, the wireless air can be considered one large, common channel over which all sensors are talking. Generally, an installer can enroll a sensor with a wireless system by causing a unique, uncommon transmission to be sent by the sensor, in order to ensure the correct sensor among many is being enrolled. Or, in another example, a unique identifier can be known for a sensor and entered into the wireless system. In a further example, installing old sensors with a wireless system (e.g., in takeover installations of old sensors) can include the installer identifying the make, model and function of each old sensor, which can be time-consuming and can require a fair amount of installer expertise. Regardless of how it is accomplished, the enrollment paradigm may be considered "closed," in a sense that an installer or user knows the sensors that are to be enrolled as part of the system, and some user action with the sensor is performed so that the desired sensor is installed.

Conventional closed systems provide technological and other barriers to recognizing sensors. For example, recognizing, enrolling and configuring wireless sensors in conventional closed systems is generally non-trivial because the wireless air surrounding the sensors is a large, common channel where all sensors are talking. Generally, an installer must cause a unique, uncommon transmission to be sent from a sensor in order to assure that the correct sensor among many is being enrolled. Alternatively, a unique radio frequency identifier (RFID) must be known and entered.

Further, in take-over installations of old sensors, installers must identify the make, model and function of each old sensor in order to properly enroll and configure each old sensor. All of these types of actions can require significant time, expertise and cost.

SUMMARY

This document generally describes systems, devices, computer program products, and techniques to allow for the vast majority of wireless sensors to be servable, meaning they can be enrolled into and configured in an application computing system. This can include a wireless sensor "discovery" process in which an application computing system (e.g., a wireless security system) becomes connected with a sensor population that includes sensors from different manufacturers, using different protocols, doing different sensing functions, communicating in closed wireless manner (e.g., sensors not broadcasting their identity in a manner that is standardized across vendors or an industry), and being different operational models and vintages. Such a wireless system using the wireless sensor discovery methodologies described herein can automatically connect to a diverse sensor population like this without needing to be configured or programmed regarding the specifics of each sensor, but can instead learn such specifics by observing, evaluating, and analyzing wireless signals transmitted through the wireless space.

In this sense, it may be said that the "closed" paradigm of setting up and configuring a premises application computing system including wireless sensors has shifted to one that is "open," in the sense that wireless sensors intended to be used only in a "closed" system may be used in any application computing system without the need for the typical "closed" system enrollment and programming requirements.

In one implementation, a method of assessing wireless sensors in the vicinity of an application computing system includes, first, operating the application computing system in a listen mode to receive and record wireless transmissions produced by one or more wireless sensors producing wireless transmissions in the vicinity of the application computing system. The method also includes evaluating the recorded wireless transmissions using a rule set that embodies normal operating characteristics of various types of wireless sensors in an operating environment. The evaluation is performed to generate a conclusion regarding at least one attribute of at least one wireless sensor that produced the recorded wireless transmissions.

This sensor evaluation method may occur with no user involvement, in other words, without a user causing a wireless sensor to make a special wireless transmission that tells the system that the sensor making that special transmission is to be enrolled into the system, and/or without a user or installer entering information into the system using for example a bar code or other sensor entry techniques. In addition, the sensor evaluation method may avoid the user having to determine a proper configuration of sensors and the system, in that the system utilizes a rule set that has captured how a range of different sensors may act (make transmissions) in a typical environment and set-up. In this sense, the system implements artificial intelligence and expert system methodologies.

Of course, a user or installer may be involved in the evaluation method without departing from the principles being newly described herein. For example, a user may enter preliminary information before a "discovery" sensor evaluation method is executed, and/or the system may provide a user prompt after a "discovery" process has taken place, presenting a "best guesses" as to, for example, what sensors are present in the environment, what type of sensors they are, where they are located in environment and in relation to one another, and how the sensors and system may be configured given those sensors. A user may then make entries confirming information presented, or modifying it, for example, before an enrollment of sensors or configuration (or change of configuration) of sensors and system actually occurs.

These and other implementations can each optionally include one or more of the following features. The generated conclusion can be used in a process to enroll the at least one wireless sensor into the application computing system. The generated conclusion can be a probable assessment regarding a type of sensor for one of the at least one wireless sensor. The assessment of the at least one wireless sensor in the application computing system can include presenting to a user information related to the probable assessment. That probable assessment may regard at least one of the following: type of sensor, sensor function, sensor use case, or other attribute for the at least one wireless sensor.

The assessment of the at least one wireless sensor in the application computing system can further include receiving information from a user in response to presenting information to the user. Alternatively or additionally, the method can further include receiving preliminary information regarding wireless sensors in the vicinity of the application computing system. The preliminary information may include less information than is required to fully utilize the wireless sensors in the application computing system. The received preliminary information can be provided by a user. The received preliminary information can be input from an information source. The conclusion can be provisional, and the conclusion can be changed or further refined using further information. The further information can be derived from further assessments. The sensor can be utilized in the application computing system while the system is operating in a normal mode. The method can further include using the generated conclusion to utilize the at least one wireless sensor in the application computing system.

In another implementation, a method of programming an application computing system includes, first, operating the application computing system in a listen mode to receive and record wireless transmissions produced by one or more wireless sensors producing wireless transmissions in the vicinity of the application computing system. The method also includes evaluating the recorded wireless transmissions using a rule set that embodies normal operating characteristics of various types of wireless sensors in an operating environment to generate a conclusion regarding a probably preferred attribute or behavior of the application computing system. The method also includes using the generated conclusion to program responses of the application computing system.

These and other implementations can each optionally include one or more of the following features. The conclusion can be provisional, and the conclusion can be changed or further refined using further information. The further information can be derived from further assessments. The sensor can be utilized in the application computing system while the system is operating in a normal mode.

Certain implementations may provide one or more advantages. For example, a person installing a wireless system can connect to existing sensors and use their information without having to identify the sensors' protocols, parameters, or functionality, and without having to configure the system to use the existing sensors. Instead, the wireless system can automatically learn the wireless sensor environment in which it exists, which can make the information provided by the wireless sensors available without the technical hurdle of configuring the wireless system for each of the sensors. This can allow for installation expertise and training to be reduced, and for the value of existing sensors to be increased by making the data more widely and easily available.

In another example, preexisting sensors operating within a closed wireless environment can be identified and passively enrolled with a third party system so that information from the preexisting sensors can be leveraged for other applications and uses with the third party system. Closed wireless environments include environments in which sensors do not wirelessly broadcast their identity, do not allow for enrollment outside of specifically authorized devices, and do not make available other wireless communication details (e.g., wireless transmission protocol, packet fields and data encoding). Security systems with various wireless sensors and devices that communicate with a security system panel (or other authorized security system computing device) are one example of a closed wireless environment. However, such closed environments can generate a variety of information that may be useful outside of the specific closed environment context. For instance, security system sensors can provide information that can be used for automatically controlling home automation systems. By passively detecting and enrolling sensors from closed wireless environments, the capability of third party systems can be expanded without having to install separate (and redundant) sensor arrays. For instance, if a security system with wireless security sensors already exists at a home, a home automation system can tap into the stream of security sensor information (e.g., door open/closing events, detected presence/motion of users within the home) to provide home automation features based on these features without having to install a separate home automation sensor array within the home. Additionally, the passive detection and enrollment of such security sensors with a home automation system can be accomplished without having to perform any sort of formal enrollment with the security system, which can ease the process of enrolling closed wireless system sensors with third party systems.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE ATTACHMENTS

FIG. 1A is a block diagram of an example environment in which an application computing system discovers sensors.

FIGS. 1B-C are conceptual diagrams of an example system passively detecting and enrolling various preexisting wireless sensors that are part of a security system a home.

FIG. 3 is a chart showing an example list of configurable sensor attributes that can be used for sensors in the system.

FIG. 4A is a table listing example sensor types of sensors that can be part of the system.

FIG. 4B is a table listing example sensor configuration data of sensors that can be part of the system.

Like reference numbers and designations in the various drawings indicate like elements.

DETAILED DESCRIPTION

Figure 1A:
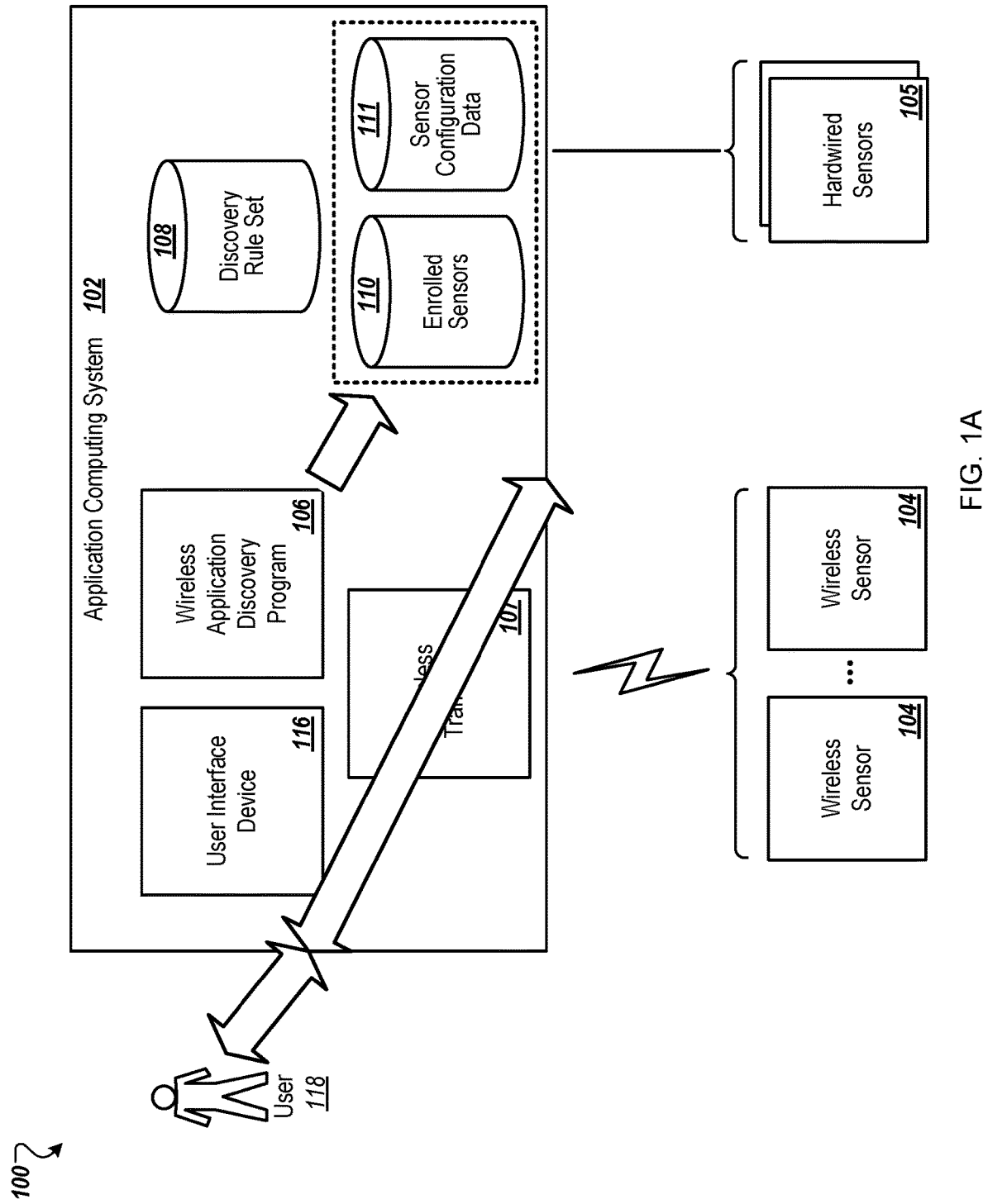

To obtain and use information from wireless sensors, a wireless system can recognize, enroll, and configure wireless sensors into its system.

For example, an application computing system, which may be referred to herein as a wireless system, can automatically detect, configure, use, and anticipate expected operation of wireless sensors. A wireless gateway used in a security system (such as the Helix system manufactured and distributed by the assignee of the present application) or an intelligent wireless "translator," may be part of an example wireless system that is able to automatically (or with minimized user assistance) discover, enroll, classify, and configure the system to respond to, and pass on information from, existing sensors, regardless of the sensor manufacturer, protocols, sensing functions, radio frequencies, and/or operational models/vintages.

The wireless system can, for example, use a multitude of objective and subjective algorithms to set up the system to utilize these existing sensors. Further, the algorithms can aid in discovering existing sensors from the sensors' supervisory or responsive wireless transmissions, which can involve numerous steps and phases, including deductions and inferences about interrelationships of pieces of information.

The wireless system can, for instance, automatically connect to various sensors by accumulating and/or measuring objective, deterministic information that is wirelessly detectable. Such information can include, for example, one or more of the following: frequency of operation, modulation type, modulation parameters, error detection scheme, timing of transmissions, signal strength, signal strength relative to other sensors, unique identifiers (e.g., serial numbers, identifiers), device type, and status information such as tamper, battery state, alarm state, temperature, humidity, and other conditions).

The wireless system can use various pieces of information to form a working theory of where, what, and how sensors are operating in a particular location, such as a home, a building, and/or other location. For instance, the wireless system can progress through a series of logical deductions, inferences, and/or possibilities that can narrow down each sensor's identity (e.g., type, manufacturer, protocol) from a broad range of sensors to a smaller pool of candidate sensors. Multiple iterations of deductions, inferences, and possibilities can be performed that include generating working theories for each sensor, which can be tested (e.g., theories evaluated against wirelessly detected sensor information) and then improved upon to generate better theories, which can be further tested. In some instances, theories can be additionally narrowed through actual requests for information from humans, like a pre-educated setup wizard.

The wireless system can deduce a variety of subjective information and/or indirect conclusions. Example information that is queried and/or obtained can include: 1) what type of device the sensor is, such as magnetic door/window sensor, a motion sensor, and/or a tilt sensor, to name only a few possibilities; 2) whether the sensor is a perimeter sensor (e.g., door or window sensor) or an interior sensor (e.g., motion detector pointing inside); 3) where a particular sensor might be located (e.g., garage overhead door, garage entry door, basement motion detector); and/or 4) what the sensor might be named/referred to as (e.g., "front door"). Conclusions can include probable assessments regarding a type of sensor for a given wireless sensor. Each generated conclusion can ultimately be used in a process to enroll the at least one wireless sensor into an application computing system that controls sensors. Conclusions can be presented to a user and can include information related to the probable assessment regarding the probable type of sensor, the sensor's function, a sensor use case, and other attributes or information for the wireless sensor.

In addition, various subjective deductions can be made on less definitive information, such as one or more of the following: 1) the time delay between opening (an alarm condition) and closing (a restore); 2) the time of day the sensor sends various information; 3) the number of sensor trips per day, and distribution of such trips throughout the day, 4) the interrelationship and relative timing or order between two or more sensors tripping; 5) the relationship between sensor trips and other information collected by the wireless system itself, such as audio information, vibration, etc. 6) the interrelationship and relative timing or order between a security system reporting over observable methods such as phone, cellular or IP networks and the tripping of one or more sensors, 7) the minimum time between any two trips of a sensor (e.g., the fact that most wireless motions "lock out" for 3 minutes after any trip, could be used in guessing the sensor is a motion sensor); and/or 8) the state of various status bits in the transmissions may also give clues to the exact type of sensor (e.g., some sensors may default certain unused bits a certain way).

Using the techniques described in this document, wireless energy can be detected and evaluated, and wireless parameters and/or protocols can be determined. For example, the wireless system can detect information that includes the frequency band of detected wireless signals, the modulation method and parameters. Using the detected information, the wireless system can discern the particular protocols predominant at the location (e.g., in the home). The sensor manufacturer can be determined, which may serve to introduce a whole additional subset of information about the sensor and how it operates. The sensor manufacturer may be determined, for example, from one or more of the frequency band, modulation method and parameters, particular protocols, and/or other information/wireless characteristics.

Local sensors—meaning sensors that are being used at the vicinity (e.g., house or home, building, or other location) where the wireless system is installed—can be differentiated from sensors at neighboring vicinities (e.g., neighboring home, building, or unit). For example, the wireless system can discover more than one protocol being used in the vicinity. The system can then survey the relative signal strengths of the populations of protocol 1 and protocol 2 sensors, and may conclude that the lower signal strength sensors are from a neighboring home and should generally be ignored. The system may even postulate that a neighboring home has the same protocol sensors, but by evaluating and comparing their signal strengths, can determine that those significantly lower signal strengths are from neighbor's sensors and not from the local vicinity. Other information may also be used to determine which sensors belong to the local vicinity. For example, interrelationships between multiple sensors or between a sensor and wireless-systemgenerated information contain information that is useful in determining whether a sensor is part of the local system.

In addition, sensor identifier numbers (IDs) included in all wireless transmissions made by a sensor and/or sensor type information can be determined using the techniques described in this document. For example, using the protocol information for the detected sensors, the wireless system can start looking at the next layer of information, such as evaluating supervisory check-ins over a period of time (e.g., several hours) to make a listing of the sensor IDs at the vicinity. For instance, since sensors generally send an hourly supervisory check-in, within several hours, the system should know what sensors it can hear well, and can make a confident listing of the sensor IDs in the home. Part of this monitoring and evaluation can also include examining whether the sensor protocol sends device types, which can be catalogued as well. In the absence of device types, the system can start evaluating what the device types might be based on detected patterns. For example, a sensor that closes about five seconds after opening might be a door/window sensor. A sensor that closes a split second after it alarms (or never closes at all) might be a motion sensor. If that same sensor has never alarmed twice closer than three minutes apart, it is a good guess it is a motion sensor. The system can include a variety patterns that are associated with particular types of sensors, which can guide the evaluation and determination of the device type.

Further yet, locations where sensors are placed within the vicinity can be determined. For instance, the wireless system can evaluate where the sensors are placed, again, based on detected patterns for the particular sensors and/or patterns across multiple sensors. For example, if a sensor is the first one to trip in a series of sensor trips, and the delay between open and close is about 30-60 seconds, it might be the garage door. The next trip might be the garage entry and the following trip might be the motion. Again, the wireless system can include a variety patterns that are associated with particular sensor locations (absolute and/or relative to each other). Sensors that are not frequently tripped will still transmit supervisory messages. These sensors can be identified, but are typically installed on the perimeter of homes or would fall into a life-safety sensor category.

Detecting and configuring sensors may be performed across a number of living-experience-days before the system has converged on a determination of the home's likely sensor configuration. Once the system has converged on a solution (e.g., the determined sensor configuration has not deviated more than a threshold amount over a recent period of time, such as an hour, 6 hours, 12 hours, one day), a set-up wizard session can be initiated with the user based on the determined sensor configuration. Such an example setup wizard can include one or more of the following questions. In a first example, the setup wizard can ask a question along the lines of, "When you come home, you seem to trip the following three sensors: <sensor_A>, <sensor_B>, and <sensor_C>, Might these be the garage door, the garage entry, and kitchen motion detectors?" In another example, the setup wizard can ask a question along the lines of, "These three sensors <sensor_X>, <sensor_Y>, and <sensor_Z> never seem to open, might they be windows?" If the user answers affirmatively in this case, the setup wizard can ask a question along the lines of "Could you please open and close all the windows that have sensors on them? And once you've done that, come back and name them in the same order." In another example, the setup wizard can send a text to the homeowner's phone along the lines of, "You just tripped a sensor. What would you like to call that sensor?"

In some implementations, the system may be able to proceed without the setup wizard if the system determines a conclusion with a sufficiently high degree of confidence and/or may only perform specific portions of the setup wizard when irreconcilable inconsistencies are present in the sensor configuration after a threshold period of time (e.g., several days, one week).

Systems and services outside of security could see value in the information from security sensors. As such, it may not be necessary that the sensors be immediately, or even perfectly configured into the non-security system. It can be acceptable for the security sensors to be incorporated gradually over time, as the non-security system learns the security sensors. The system can figure out as much as it can in the background and, if appropriate, can ask a user (e.g., the homeowner) the smallest possible set of configuration information in finalizing the system configuration.

The following terms are applicable to this disclosure. "Observation" refers to listening to sensors and retaining information and/or characteristics of the sensors. For example, the system can perform observation of yet unknown sensors when the system is initially installed, such as during a learning period, and observation can continue on an ongoing basis after a sensor is known to the system. "Assessment" refers to making one or more conclusions about the sensors, using at least the information determined through observation and/or the use of a rule set. For example, assessment of a sensor can include concluding that the sensor is a garage door, or that the sensor is an interior door, or that the sensor is an infrequently-used window. "Enrollment" refers to making a sensor a unique, known, and qualified member of a set of sensors in the purview of the system. Enrollment may include associating, with the sensor, conclusions about the sensor itself, including the sensor's type, location, and other information. "Programming" refers to configuring the system on how to treat, respond, display, and report to signals from the sensor. For example, a garage door sensor can be programmed to act differently during time periods having patterns of use consistent with normal activities of the residents of a home, versus the garage door opening and staying open for a long period of time during a work day or late at night. "Utilization" refers to using the signals and information from the sensor in the normal mode of the system. For example, utilization of a normally-closed window sensor can indicate that normal use is a rare, if ever, occurrence, and a motion sensor in a kitchen occurs many times each day. Utilization can incorporate time-of-day, day-of-week, holiday, vacation, and other information.

FIG. 1A is a block diagram of an example environment 100 in which an application computing system 102 discovers sensors, for example, from a third-party system. As an example, the application computing system 102 (or system 102) can be a security system that communicates with various wireless and hardwired sensors, including both security system sensors and other sensors. The system 102 can be installed at a home, business, or other location, and can immediately and over time discover wireless sensors 104 as well as operating characteristics of those wireless sensors 104 and hardwired sensors 105. The wireless sensors 104 and hardwired sensors 105 can be part of a third party system, yet the system 102 can be programmed to passively detect and enroll the sensors 104/105 without participating in or completing a formal enrollment with the third party system. By enrolling existing sensors 104/105 from a third party system, the information available to the system 102 regarding the vicinity can be enhanced without having to install a separate sensor array for system 102. The system 102 may generate and provide suggested configuration information for the sensors 104 and 105 to set up, use, and continually optimize the operation of the system 102 based on the sensors 104/105.

The system 102 includes a wireless application discovery program 106 for discovering the wireless sensors 104 and the hardwired sensors 105. For example, using information received by a wireless transceiver 107 from signals generated by the wireless sensors 104, the wireless application discovery program 106 can make guesses as to the types and locations of the wireless sensors 104. For example, the wireless sensors 104 can be "closed" in a sense that they may not use a protocol that is standardized among vendors in order to broadcast their identity or other wireless information used to communicate with the sensors 104. The system 102 can detect the wireless sensors 104, determine one or more sensor types that are likely for the sensors 104, and can enroll the sensors 104 with the system 102 so that the system 102 can use the information generated by the sensors 104.

The discovery process can include the use of a discovery rule set 108 that includes, among other things, rules that can be used by the wireless application discovery program 106 for determining the types and locations of the wireless sensors 104 and hardwired sensors 105. For example, the rules can indicate that a time duration between an open and close of an alarm indicates that the sensor is, for example, very likely to be a garage door sensor. The rules can also include information that related groups of sensors, such as to identify an entry door and interior doors based on a time sequence of received signals from those sensors. The system 102 and the discovery rule set 108 can use any of a variety of techniques for determining likely sensor information (e.g., sensor type, protocol), such as scoring the sensors 104 along one or more dimensions when one or more rules from the discovery rule set 108 are satisfied by passively monitored wireless transmissions/behavior for the sensors 104. For instance, the discovery rule set 108 can include rules that identify transmission scenarios that indicate that a sensor is likely to be a door sensor (e.g., open and close events occur close to each other in time), and can allocate points that correspond to how much the scenario indicates that the sensor is a door sensor. Once a threshold number of door sensor points have been achieved, the system 102 can determine that the sensor is likely to be a door sensor. Points may be allocated along dimensions corresponding to each type of sensor, as well as being allocated for other sensor characteristics that can be detected/inferred by the system 102. The system 102 can be programmed to identify multiple potential sensor types for each sensor, when warranted based on points for the sensor types exceeding a threshold score. Other scoring and rule set evaluation techniques are also possible for the system 102.

During the discovery process, the wireless application discovery program 106 can enroll identified sensors, such as in an enrolled sensors data store 110. Enrollment information can include, for example, sensor identifiers (identifying each sensor to the system 102), sensor types, sensor locations (absolute within a building and/or relative with regard to other sensors), and other information, as described below. Sensor configuration data 111 can include, for each enrolled sensor, configuration information such as communication protocols. Enrollment of the sensors 104 with the system 102 can cause the system 102 to persistently monitor for wireless transmissions from the sensors 104, to process the wireless transmissions (e.g., determine what is happening in a building based on the transmission from the sensor), and to perform further actions based on the processed wireless transmissions (e.g., transmit information to a cloud based system, automatically perform an operation, transmit an alert/notification to the user). The discovery process can continue such that new wireless devices that are later installed in the home can also be observed and assessed for inclusion in any non-security or alternative security solutions.

A user interface device 116, such as an interactive display provided for use by a user 118, can display information and receive user inputs. For example, the user interface device 116 can display "best guess" information, informing the user 118 of the best guesses as to the types and locations of the sensors discovered by the system 102. The user interface device 116 can display prompts, including through the wizard described above, that allows the user to provide input associated with sensors and/or confirm assumptions made by the system 102. In some implementations, the user interface device 116 is part of the system 102, such as a panel on a main controller of the system 102, a remote user interface device that communicates with the system 102, an app on a mobile device (e.g., a smartphone), or some other device.

Figure 1B:
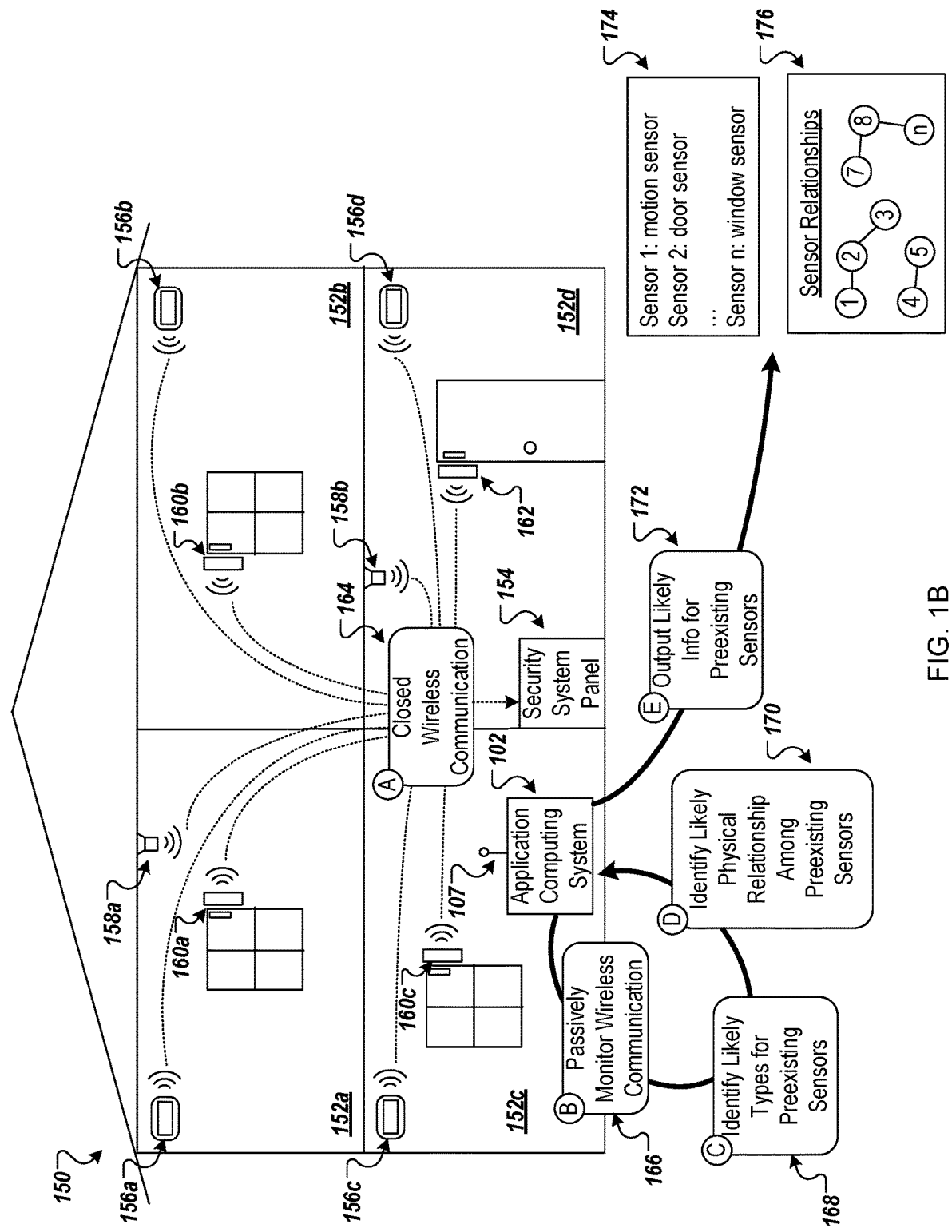
Figure 1C:
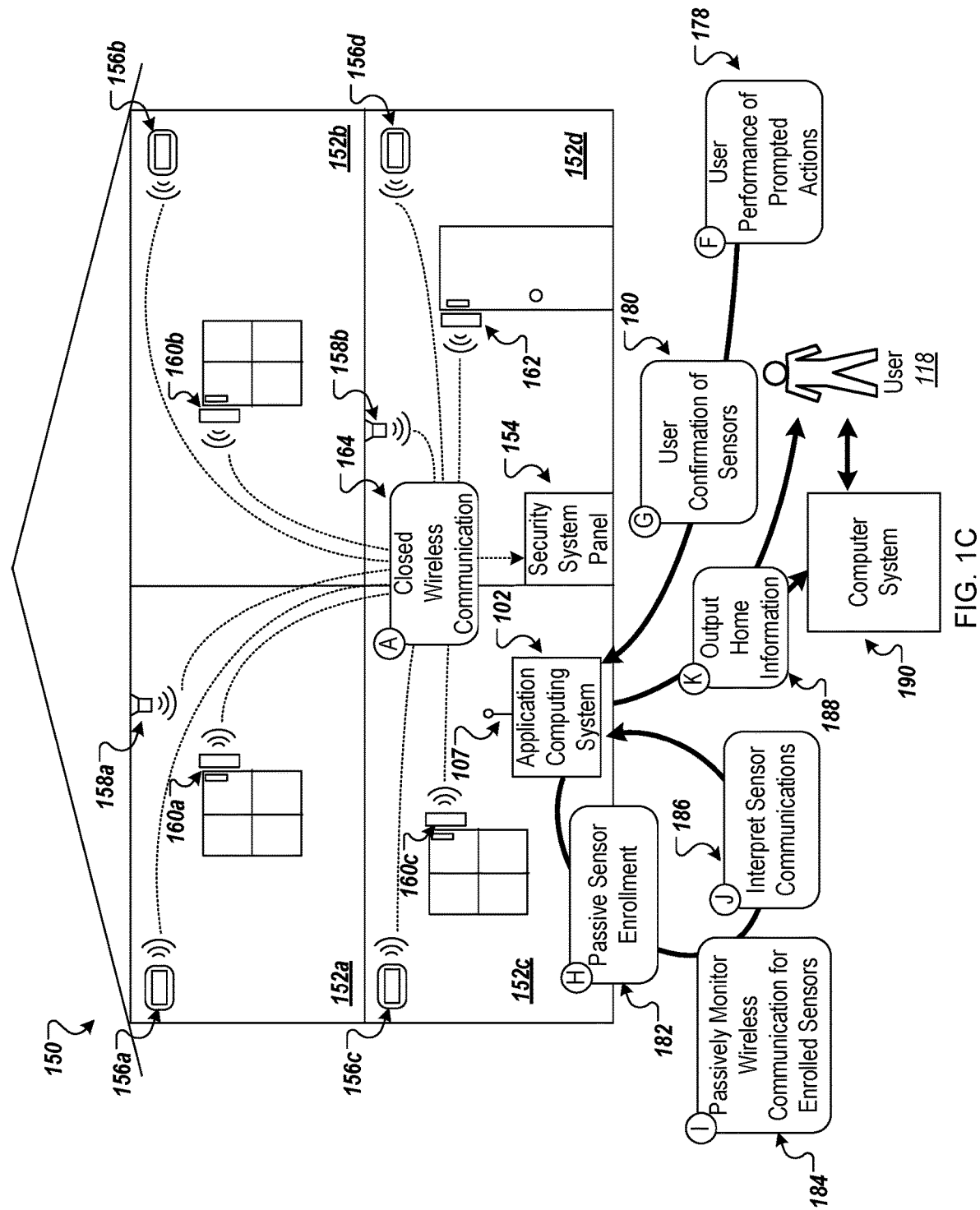

FIGS. 1B-C are conceptual diagrams of the example system 102 passively detecting and enrolling various preexisting wireless sensors 156-162 that are part of a security system a home 150. Although these figures refer to a preexisting security system in the home 150, the system 102 can be used to passively monitor for and enroll sensors from other types of systems within the home 150. Additionally, the example security system is depicted as being configured to have the sensors 156-162 communicate over a closed wireless environment. The system 102 can be used to detect and enroll sensors both within and outside of closed wireless environments.

Referring to FIG. 1B, which generally depicts discovery of wireless sensors, the example and simplified home 150 includes four different rooms 152a-d that each include different sensors, such as motion sensors 156a-d, smoke/heat/air sensors 158a-b, window sensors 160a-c, and a door sensor 162. Additional and/or alternative sensors are also possible. These sensors are part of a closed wireless communication environment in which the sensors 156-162 communicate observed information (e.g., door open/close, motion) wirelessly to the security system panel 154 using closed wireless communication, as indicated by step A (164). The closed wireless communication can be, for example, communication in which the sensors 156-162 transmit over a common wireless channel without broadcasting the SSID, the MAC address, and/or other details relevant for listeners outside closed wireless communication network (e.g., the sensors 156-162 and the security system panel 154) to understand the context of the wireless transmissions. The sensors 156-162 and the security system panel 154 can be preconfigured to communicate with each other across a common closed wireless communication channel, such as being preprogrammed by the manufacturer and/or installer to communicate in this way.

The closed wireless communication (step A, 164) can include, for example, a stream of wireless communications from the sensors 156-162 at various intervals of time depending on the type of sensor. For example, the motion sensors 156a-d may transmit wireless signals whenever motion is detected and, thus, may provide transmissions at irregular intervals of time. Similarly, the window and door sensors 160-162 may transmit wireless signals at regular intervals when a window door is open (e.g., transmit wireless signal every 1 second while the window/door is open) and a wireless signal whenever the door or window subsequently closes. The smoke/air sensors 158a-b can transmit wireless signals indicating when smoke and/or other potentially harmful air conditions are detected. The sensors 156-162 may additionally transmit status signals at regular intervals of time outside of particular events being detected (e.g., motion, door open/close events, smoke detected events) to confirm with the security system panel 154 that they are powered and functioning properly. The sensors 156-162 and the security system panel 154 can be preprogrammed to communicate using common wireless protocols and data encoding techniques so that the communication from the sensors 156-162 are properly received and interpreted by the security system panel 154.

The application computing system 102 and its wireless transceiver 107 can be positioned within the home 150 to detect the closed wireless communications from the sensors 156-162 through passive monitoring of the wireless communication, as indicated by step B (166). The sensors 156-162, their type, and their locations throughout the home 150 can be unknown to the system 102. The passive wireless monitoring can include, for example, monitoring wireless transmissions across multiple different wireless channels, identifying wireless packets that are transmitted, and recording wireless packet transmissions, along with timestamps for their occurrence. These wireless packets can be recorded over a period of time (e.g., 12 hours, one day, one week, one month) so as to provide a good sample size of wireless transmissions for the wireless environment from which information about the sensors 156-162 can be passively inferred (as opposed to being directly determined, such as through a direct/formal enrollment process with the sensors 156-162).

As indicated by step C (168), the system 102 can use the detected wireless communications over a period of time to determine the likely type for the preexisting sensors 156-162 in the home 150. For example, the system 102 can apply the discovery rule set 108 to the wireless communications to identify wireless communications that indicate the sensor type of the sensor transmitting the communication. Applying the rule set can include, for example, identifying particular wireless transmissions and/or patterns of wireless transmissions that indicate the sensor as being a particular type of sensor. Inferences made based on the discovery rule set 108 can be made in any of a variety of ways, such as applying tags to particular detected sensors based on particular rules being satisfied and/or using a scoring scheme in which scores are applied and aggregated for sensors across rules being satisfied, and then aggregated scores are evaluated against sensor-type thresholds to determine whether the sensor is likely a particular type. As discussed above, the sensor determination can include not only determining the likely type of sensor, but also other sensor attributes (e.g., perimeter sensor vs. interior sensor, sensor for main entrance vs. secondary entrance).

As indicated by step D (170), the system 102 can additionally identify the likely physical relationship among the preexisting sensors. For example, the system 102 can evaluate the relative timing of various wireless transmissions by the sensors to infer the physical proximity of sensors to each other. Using the recorded timestamps of detected wireless packets, the system 102 can identify various sensor events that occur in close proximity in time, which can be used to infer physical proximity. The repeated presence of particular patterns of sensor transmissions over time can increase the likelihood that two or more sensors are located near each other within the home 150. For instance, when a user enters the home, the door sensor 162 will transmit an open door signal and, shortly thereafter, the motion sensor 156d in the room 152d into which a door monitored by the door sensor 162 enters will transmit a motion signal. The repeated occurrence of wireless signals being transmitted close in time by the door sensor 162 and the nearby motion sensor 156d can indicate that these two sensors are located near each other in the home 150. The system 102 can identify temporal patterns of sensor transmissions within the home 150 during an observation period to infer the relative physical layout of sensors within the home 150.

With the likely sensor types and the likely physical relationship (proximity) of the sensors identified, the system 102 can output these determinations, as indicated by step E (172). For example, the system 102 can output example likely sensor types 174 and example likely sensor relationships 176. Although the likely sensor types 174 are indicated as being one likely sensor type for each detected sensor, sensors may have more than one detected likely sensor type. The sensor relationships 176 depict groupings of sensors that are determined to be physically near each other, along with other location/relationship information, such as some sensors being perimeter sensors and other sensors being interior sensors. The information 174-176 can be output, for example, to the user 118.

Referring to FIG. 1C, which generally depicts passively enrolling and using preexisting sensors with the system 102, the user may be prompted by the system 102 to perform various actions that can be used by the system 102 to further confirm various hypothesis about sensor type and/or location, as indicated by step F (178). For example, the system 102 can output a series of prompts for the user to open the front door and then to open the back door in the home 150, and then can proceed to monitor the wireless communication (step A, 164) to detect sensor activity that can be correlated to the locations requested by the system 102. The system 102 may prompt the user to perform actions when, for example, there is not a sufficient amount of wireless sensor data to differentiate between multiple hypotheses regarding sensor type, location, and/or other sensor information. System 102 may not always provide prompts to the user.

Once the system 102 has obtained sufficient sensor information to arrive at a set of sensor hypotheses for the sensors 156-162 within the home 150, the system 102 can prompt the user to confirm the inferred sensor types and/or locations, as indicated by step G (180). The user confirmation can cause the system 102 to passively enroll the sensors 156-162 from the closed wireless communication environment with the system 102, as indicated by step H (182). Passive enrollment is different from active enrollment in that, with passive enrollment, the entire enrollment process has been through passive monitoring of wireless sensor transmissions. In contrast, during active enrollment, the sensor would enter an enrollment mode during which it at least identifies itself to the system/device enrolling the sensor and then confirms its enrollment by transmitting/outputting some sort of confirmation of enrollment (e.g., transmit a shared secret between the sensor and the enrolling device). However, with passive enrollment, the system 102 enrolls the sensors 158-162 without any of these steps being available to the system 102—meaning no enrollment mode being entered for the sensors, no transmission of sensor identity (or other wireless sensor transmission information, such as transmission protocols, data encodings), and no confirmation of enrollment between the sensors 158-162 and the system 102. Enrollment means that the system 102 knows the identify and parameters for the sensors 158-162 (e.g., sensor type, sensor proximity to other sensors), and continually monitors for and interprets wireless transmissions from the sensors 158-162 to detect events that are occurring within the home 150, such as the door being open or closed, a person being located in various rooms 152*a-d* of the home 150, and/or emergency situations (e.g., smoke detected in the home).

For example, after enrolling the sensors, the system 102 can use the enrollment information to continue to passively monitor wireless communications from the enrolled sensors, as indicated by step I (184). The system 102 can interpret the sensor communications using the enrollment parameters for the sensors, as indicated by step J (186). For example, once the system 102 has identified the sensors 156*a-d* as motion sensors, the system 102 can interpret subsequent detected wireless transmissions from theses sensors as motion-related activity within the home 150. The information on the enrolled sensors that is used by the system 102 to perform steps I and J can be stored in 110 and 111, as described above in FIG. 1A.

The system 102 can use and/or transmit home information (e.g., events within the home, such as doors being opened, people being present within particular rooms, emergency conditions) that has been determined from monitoring wireless transmissions from the enrolled sensors, as indicated by step K (188). For example, the system 102 may provide one or more services locally within the home 150, such as home automation services, and can use the determined home information to automatically determine various home automation actions to perform, such as closing/opening automated windows, automatically turning lights on/off, automatically locking doors, and/or other home automation techniques. In another example, the system 102 may transmit information to a remote computer system 190 (e.g., cloud-based computer system) that obtains home information and provides services to the user 118, such as home monitoring and/or security services to the user 118. In some instances, the computer system 190 may be a hub of home information that makes the home information available to various systems and/or services that use the home information and that are authorized by the user 118. So instead of each system/service needing to have its own sensor array within the home 150, the computer system 102 and the system 190 can make the home information available to a broader collection of services and/or systems that can leverage the information. The home information can be provided to the computer system 190 in real time, which can permit services and/or systems using the information to have information on the current state of the home 150 and to provide appropriate corresponding processing. In another example, the system 102 can provide the home information directly to the user 118, such as through a user interface that is part of the system 102 (e.g., the user interface device 116) and/or by transmitting the home information to another user computing device (e.g., smartphone, wearable device).

Although the example depicted in FIGS. 1B-C includes a single security system from which the system 102 is enrolling sensors, the system 102 can passively enroll sensors from multiple different systems within the home 150. For example, the system 102 may passively enroll sensors from both a home security system and from a home automation system within the home 150. Additionally, the system 102 can passively enroll sensors from both closed and open wireless communication networks. Although the system 102 is presented as being used in the home 150, it can be used in other environments, such as businesses, multi-tenant units (e.g., condos, apartments), extended range sensor environments (e.g., indoor/outdoor sensor systems, such as at an entertainment park), and/or other environments.

Additionally, although the enrollment process (steps B-H, 166-182) is depicted as being concluded after step H (182), it can continually be performed by the system 102 while using the enrolled sensor information (steps I-K, 184-188). For example, while performing steps I-K the system 102 can continually perform steps B-H to identify new sensors and/or changes to the sensor arrangement within the home 150, and to further refine/improve upon the enrolled sensor information.

The system 102 and the closed security system depicted in FIGS. 1B-C can be different from each other and/or part of the same system. For example, the system 102 can run in parallel to and be separate from the closed security system. In another example, the system 102 can be part of the closed security system and the steps A-K can be part of the home wireless learning process for setting up a new closed security system. In another example, the system 102 can be the new security system for the home 150 and the closed security system can be an old system for the home 150 that no longer exists or is no longer active. Other configurations are also possible.

Figure 2:
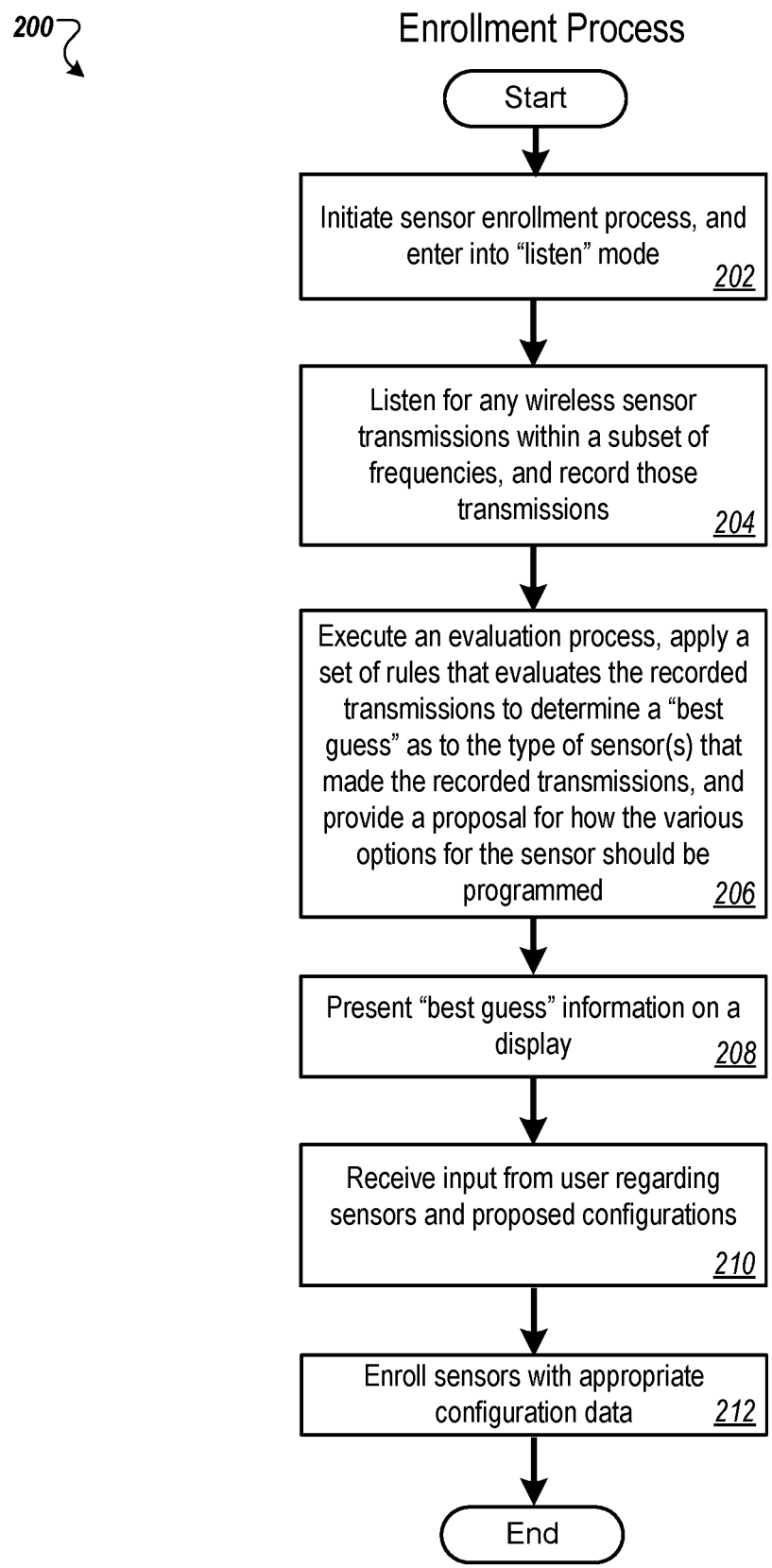
FIG. 2 is a flowchart of an example enrollment process for enrolling sensors into the system.

FIG. 2 is a flowchart of an example enrollment process 200 for enrolling sensors into the system 102. In some implementations, the enrollment process 200 can be performed by the wireless application discovery program 106 in combination with other components of the system 102. The enrollment process 200 can be similar to the steps B-H (166-182) described above with regard to FIGS. 1B-C.

The sensor enrollment process is initiated by the system 102, and the system 102 enters into "listen" mode (202). For example, once the system 102 is initially installed, the system 102 can listen to transmissions produced by the wireless sensors 104, such as passively monitoring for wireless communications (step B, 166).

The system 102 listens for any wireless sensor transmissions within a subset of frequencies, and the system 102 records those transmissions (204). For example, the system 102 can listen to frequencies known to the industry (and/or by the system 102) to be transmission frequencies of sensors and/or other equipment that may be of interest to a security system.

An evaluation process is executed by the system (206). During the process, the wireless application discovery program 106, for example, can apply a set of rules that are used to evaluate the recorded transmissions to determine a "best guess" as to the type of sensor(s) that made the recorded transmissions, relative physical proximity and/or locations of the sensor(s), and appropriate configurable options for the sensor(s). Example rules are discussed in more detail below. For example, the system 102 can identify likely types of preexisting sensors (step C, 168) and identify likely physical relationships among the sensors (step D, 170). The system 102 can then provide a proposal for how the various options for the wireless sensor 104 should be programmed. For example, based on frequencies of sensors, the rate of received transmissions, and a pattern of transmissions relative to transmissions by other sensors, the system 102 can determine that the sensor is likely of a certain type, and the system can propose options for use in programming the sensor.

"Best guess" information is presented on a display (208). The user interface device 116, for example, can display, for use by the user 118, guessed and proposed information, including the type of sensor that the system 102 believes that the wireless sensor 104 is and a proposed set of information as to how best configure the wireless sensor 104 in light of received transmissions and the evaluation process. The information exchange in this step and the next step can, for example, be part of a wireless sensor configuration wizard, as described above. For example, the system 102 can output information on the likely sensor types 174 and the likely physical sensor relationship 176 (step E, 172).

Input is received from the user regarding sensors and proposed configurations (210). For example, the user 118 can confirm information presented by the user interface device 116 and/or provide additional information, such as to identify information that the system 102 was unable to figure out. The user 118 can be prompted to perform one or more actions within the home 150 (step F, 178) and to provide confirmation of sensor information (step G, 180).

Sensors are enrolled with appropriate configuration data (212). The system 102 can enroll the wireless sensor 104, for example, using a combination of the best guess information, proposed configuration settings, and responses/inputs from the user. Enrolled sensors can be captured in an enrolled sensors data store 110, e.g., resident in the system 102. For example, the system 102 can passively enroll the sensors 158-162 from the home 150 (step H, 182).

The evaluation process that is executed by the system 102 can use a set of rules that, for a wireless sensor 104 used in normal mode operation, are consistent with behaviors that can be used to guess the attributes of sensors. The rules can be included in the discovery rule set 108, for example. Example attributes of sensors are introduced below with reference to FIG. 3.

As discussed above, a set of rules is used in the wireless discovery process. Generally, the set of rules capture normal operation of sensors used in an environment, such as a home. From these rules, inferences can be made about sensors that produced various wireless transmissions that have not yet been "learned into" (enrolled) into the system 102, and in addition, inferences can also be drawn about the configurable options for sensors already enrolled into the system 102. For example, one category of sensors includes sensors that trip regularly in normal (e.g., daily/weekly) use, rather than operating as supervisory sensors. Rules associated with sensors that trip can include information for a time interrelationship between observed sensor signals and cellular/IP/phone signals. Rules can also be associated with general characteristics of a sensor, such as the sensor's signal strength, time-of-day of sensor signals, interrelationship between two or more sensor trips, lack of sensor trips, unused bits in sensor transmissions, and default values of certain bits in sensor transmissions. Rules associated with door/window sensors can include, for example, open/close patterns, loop numbers (e.g., for Honeywell sensors), F-bit behavior (e.g., for Interlogix sensors), and sensor trip frequencies (i.e., how often). Rules associated with motion (e.g., passive infrared sensor (PIR)) sensors can include, for example, open/close behaviors, relationships to other sensors (e.g., perimeter sensors), lengths of time from open to close (e.g., as some motions will send a restore/close an exact amount of time after open/alarm/trip), a time of sleep after first tripping (e.g., most all wireless motions go to sleep for three minutes before tripping again, and a lack of a close signal (e.g., many motions send only an alarm, and no restore). Rules associated with fobs can be associated, for example, with a transmit with no supervisory signals ever, and a power-up bit sent with every packet (e.g., in Honeywell sensors).

One category of sensors includes sensors that rarely trip and only send supervisories. This category of sensors can include, for example, windows and unused doors, smoke and carbon monoxide (CO) detectors, temperature and leak sensors, and glass breakage sensors. Information that can be used to guess things about infrequently/never alarming sensors includes, for example, default bit settings, fast supervision times (e.g., since some life safety sensors are compliant with the NFPA-72 "supervisories every 200 seconds" requirement), a number of packets sent, a time between packets, and sensor identifier (ID) number characteristics (e.g., if a sensor ID does not comply with Honeywell's "Sparse ID" patent, then the sensor is an old Honeywell sensor).

FIG. 3 is a chart showing an example list of configurable sensor attributes 300 that can be used for sensors in the system. For example, the configurable sensor attributes 300 include attributes that can be guessed, concluded or selected for a wireless sensor 104 by the system 102. The attributes can include, for example, a frequency of operation, protocol information (e.g., how the sensor communicates), manufacturer information, whether the sensor is encrypted or not, a device type of the sensor, whether the sensor is normally in a perimeter or interior location, a mounting location or the sensor, a vintage of manufacture, and typical system responses of the sensor. Example system responses of the sensor can include, for example, a name/type of the sensor (e.g., garage overhead, garage interior, front door, etc.), a group number (e.g., for GE/Interlogix sensors), system response settings, whether the sensor has a perimeter or interior response, a behavior to be made by the system in certain arming levels in response to that sensor (e.g., active in stay vs. away, or alarm response, including report code, siren/silent), and whether the sensor has an instant alarm, a delayed alarm, or is a follower (e.g., a secondary sensor after a primary sensor).

FIG. 4A is a table listing example sensor types 400 of sensors that can be part of the system. The sensor types 400 identify a sensor name/type 402 (e.g., door/window, etc.), a set of inputs 404, and zone information 406. The set of inputs 404 for a sensor can identify, for example, inputs such as external, motion, panic, tilt, smoke, flood, or other types of inputs. The zone information 406 can identify a preferred zone for a type of sensor, such as perimeter, exterior, entry/exit, glass, flood zone, or other default.

FIG. 4B is a table listing example sensor configuration data 450 of sensors that can be part of the system. The sensor configuration data 450 can include, for example, a sensor name 452, a sensor description 454, an alarm type 456, a siren type 458, active levels 460 (e.g., stay, night, delay), a time delay 462, whether the sensor is supervised 464, restoral ability 466 (e.g., yes or no), sensor ID on a current sensor (CS) report 468, a report delay 470, whether the sensor is bypassible 472, whether the sensor has a chime when opened 474, whether the sensor has a chime when closed 476, whether the sensor is tamper resistant 478, whether the sensor has a low battery indicator 480, whether the sensor is a follower 482, and whether the sensor has an auto bypass 484.

Figure 5:
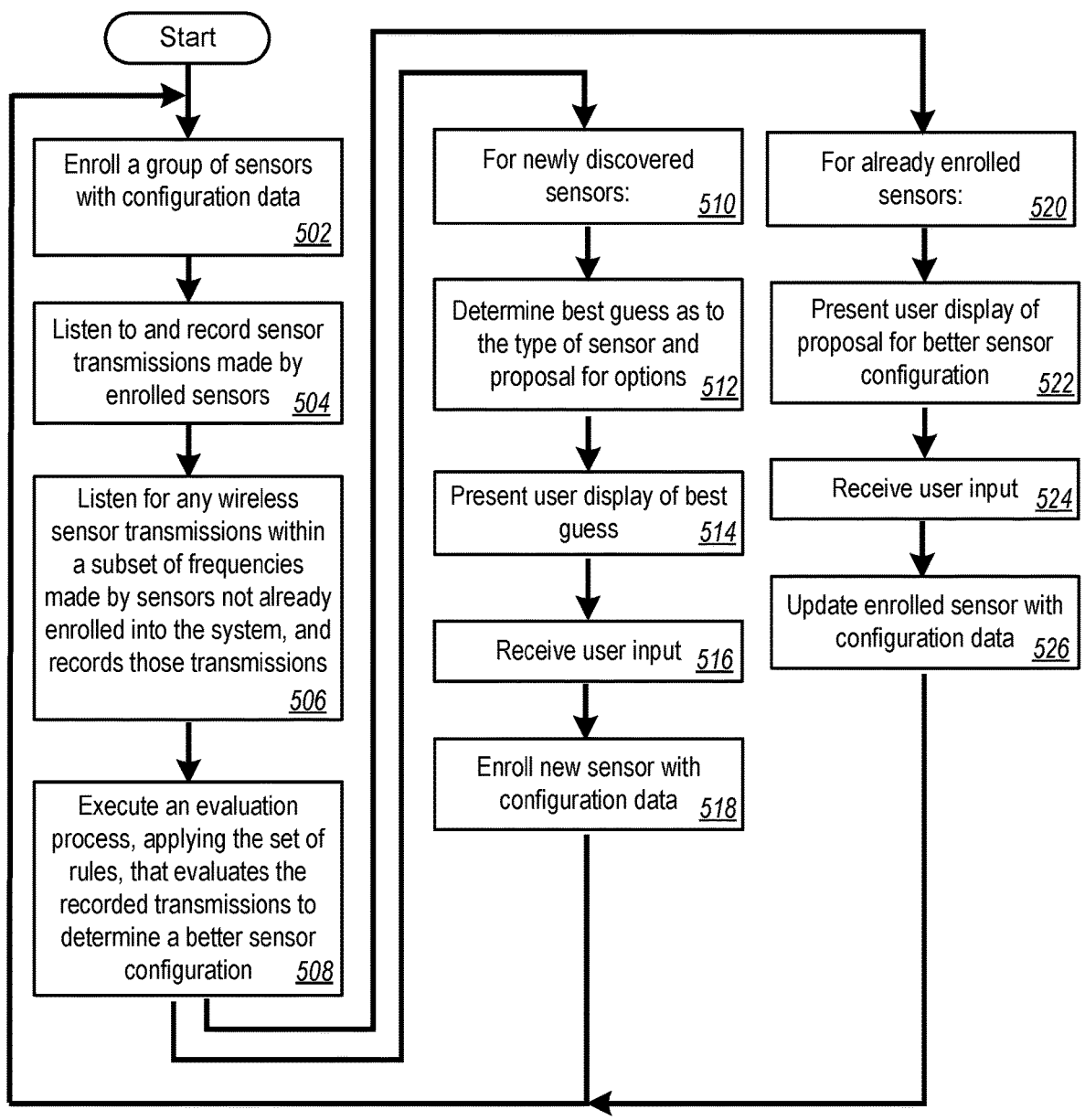
FIG. 5 is a flowchart of an example ongoing sensor monitoring process for enrolling sensors into the system.

FIG. 5 is a flowchart of an example ongoing sensor monitoring process 500 for enrolling sensors into the system 102. In some implementations, the ongoing sensor monitoring process 500 can be performed by the wireless application discovery program 106 in combination with other components of the system 102. The sensor monitoring process 500 can be similar to the steps H-K (182-188) described above with regard to FIG. 1C.

A group of sensors is enrolled with configuration data (502). For example, the system 102 can enroll a group of wireless sensors 104, as described above, for instance, with regard to the sensors 158-162 can be passively enrolled with the system 102 (step H, 182).

Sensor transmissions made by enrolled sensors are listened to and recorded (504). For example, using the wireless transceiver 107, the system 102 can listen to the wireless sensors 104, as described above, for instance, with regard to the system 102 passively monitoring for wireless communication from the sensors 158-162 (step I, 184).

The system 102 listens for any wireless sensor transmissions within a subset of frequencies made by sensors not already enrolled into the system, and those transmissions are recorded (506). For example, the system 102 can concurrently perform step B (166) while performing steps I-K (184-188).

An evaluation process is executed, in which the set of rules is applied to evaluate the recorded transmissions to determine a better sensor configuration (508). For example, the wireless application discovery program 106 can use information about the transmissions received through wireless transceiver 107 to generate information as to how the wireless sensor 104 may be better configured within the system 102. For instance, while performing steps I-K (184-188), the steps C-D (168-170) can be performed on previously enrolled sensors to determine whether improved/refined configurations for the sensors 158-162 are available.

For newly discovered sensors, steps 512-518 can be performed (510). A best guess is determined as to the type of sensor, and proposal is made for options (512). For example, the wireless application discovery program 106 can determine a best guess for the wireless sensor 104, such as that the wireless sensor 104 is an entry door sensor. For instance, the system 102 can determine the likely type and/or physical arrangement of sensors 158-162 (steps C-D, 168-170).

The best guess is presented on the user display (514). The user interface device 116, for example, can present the best guess information to the user 118, as indicated by step E (172) described above with regard to FIG. 1B.

User input is received (516). As an example, the user interface device 116 can receive, from the user 118, inputs verifying the presented information and/or inputs providing corrected information for the wireless sensor 104. For example, the user can be prompted to perform one or more actions, and to provide confirmation of the sensor configurations, as described above with regard to steps F-G (178-180).

The new sensor is enrolled with configuration data (518). For example, the wireless application discovery program 106 can enroll the wireless sensor 104, as described above, for instance, with regard to step H (182).

For already enrolled sensors, steps 522-526 can be performed (520). A proposal for a better sensor configuration is presented in the user display (522).

User input is received (524). As an example, the user interface device 116 can receive, from the user 118, inputs verifying the presented information and/or inputs providing corrected information for the already enrolled wireless sensor 104.

The enrolled sensor is updated with the better configuration data (526). For example, the wireless application discovery program 106 can update the configuration information for the wireless sensor 104.

Figure 6:
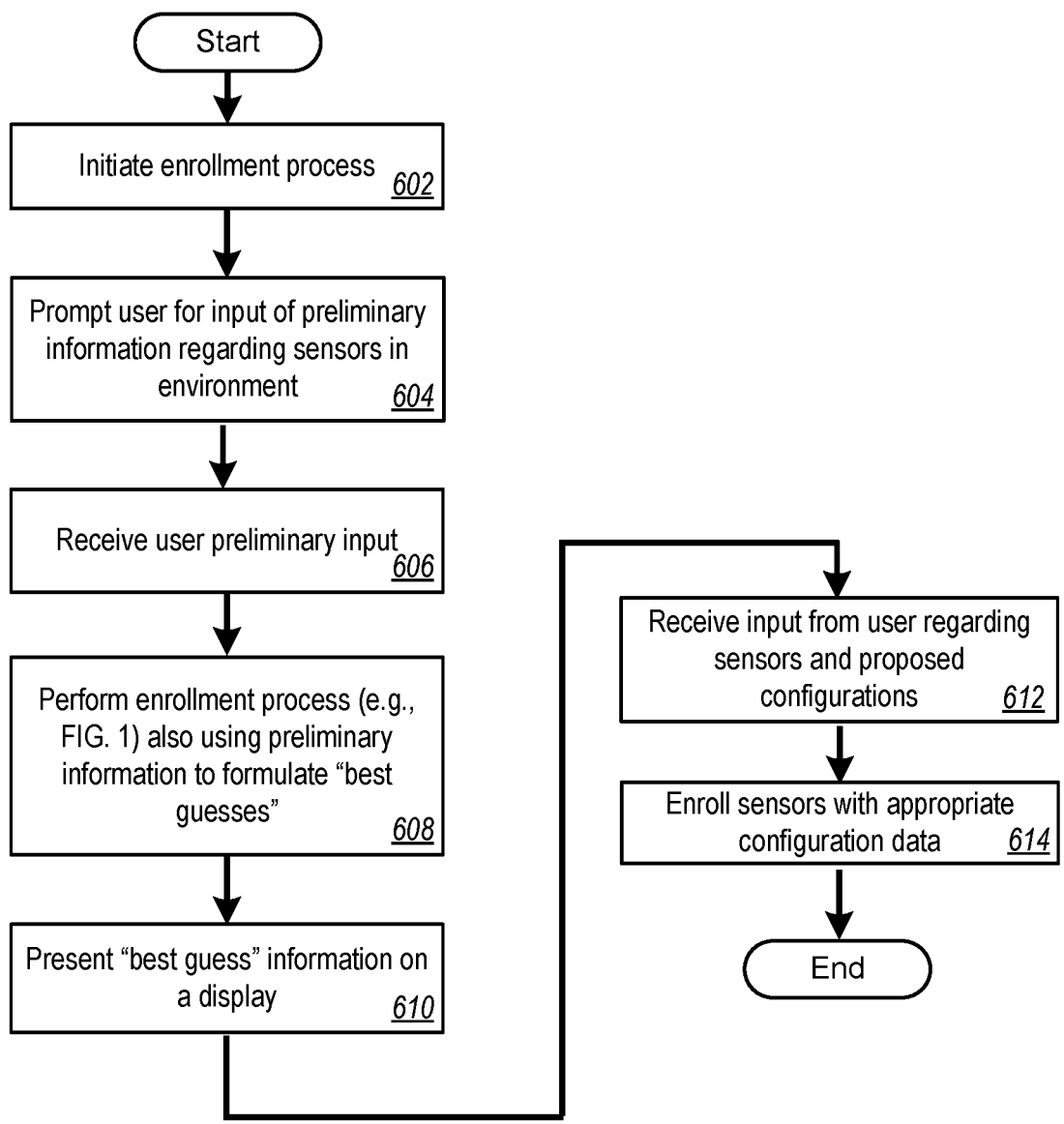
FIG. 6 is a flowchart of an example alternate enrollment process for enrolling sensors into the system.

FIG. 6 is a flowchart of an example alternate enrollment process 600 for enrolling sensors into the system 102. In some implementations, the alternate enrollment process 600 can be performed by the wireless application discovery program 106 in combination with other components of the system 102. The alternate enrollment process 600 differs from the enrollment process 200 in that preliminary information is requested of, and provided by, the user 118.

The enrollment process is initiated (602). For example, once the system 102 is initially installed, and before the system 102 starts to listen to transmissions produced by the wireless sensors 104, the system can hold off for preliminary information.

The user is prompted for input of preliminary information regarding sensors in the environment (604). The user interface device 116, for example, can query the user 118 for preliminary information about the sensor, such as the sensor's type, location, and other information.

Preliminary input is received from the user (606). As an example, the user interface device 116 can receive, from the user 118, inputs providing preliminary information for the wireless sensor 104. For instance, referring to the example depicted in FIGS. 1B-C, user input can be received with preliminary sensor information before step B (166) is performed. The preliminary sensor information can provide a starting point for steps C-D (168-170), which means that the system 102 may be able to perform step B (166) for a shorter period of time than it would be performed without the preliminary information.

In some implementations, at least some of the preliminary information input can be received from an information source, such as a local or remote data source accessible to the system 102. For example, a database can contain information about the home's setup, such as in a do-it-yourself (DIY) situation. In this example, the homeowner or a customer service person may have entered some information about sensors or their requirements online, such as the fact that the security system is to control two doors and a garage door. However, it may not be known yet which exact sensor will go on which door, so incomplete information exists upon which the system can do more discovery. During discovery by the system, the system can access missing pieces of information from an online database or other source.

The enrollment process is performed (e.g., FIG. 2), in this case also using the received preliminary information to formulate "best guesses" (608). For example, once the system 102 is initially installed and preliminary information is received form the user 118, the system 102 can listen to transmissions produced by the wireless sensors 104. Referring to the example depicted in FIGS. 1B-C, the system 102 can perform steps C-D (168-170) using the preliminary information as a starting point and then refining/adding to that information based on the passively detected information.

The "best guess" information is presented on a display (610). The user interface device 116, for example, can display, for use by the user 118, guessed and proposed information, including the type of sensor that the system 102 believes that the wireless sensor 104 is and a proposed set of information as to how best configure the wireless sensor 104 in light of received transmissions and the evaluation process. The information exchange in this step and the next step can, for example, be part of a wireless sensor configuration wizard, as described above, for example, with regard to step E (172).

Input is received from the user regarding sensors and proposed configurations (612). For example, the user 118 can confirm information presented by the user interface device 116 and/or provide additional information, such as to identify information that the system 102 was unable to figure out. For instance, the system 102 can perform steps F-G (178-180).

Sensors are enrolled with appropriate configuration data (614). The system 102 can enroll the wireless sensor 104, for example, using a combination of the best guess information, proposed configuration settings, and responses/inputs from the user. Enrolled sensors can be captured in an enrolled sensors data store 110, e.g., resident in the system 102. For example, the system 102 can perform step H (182), and subsequently use the enrolled information to perform steps I-K (184-188).

Figure 7:
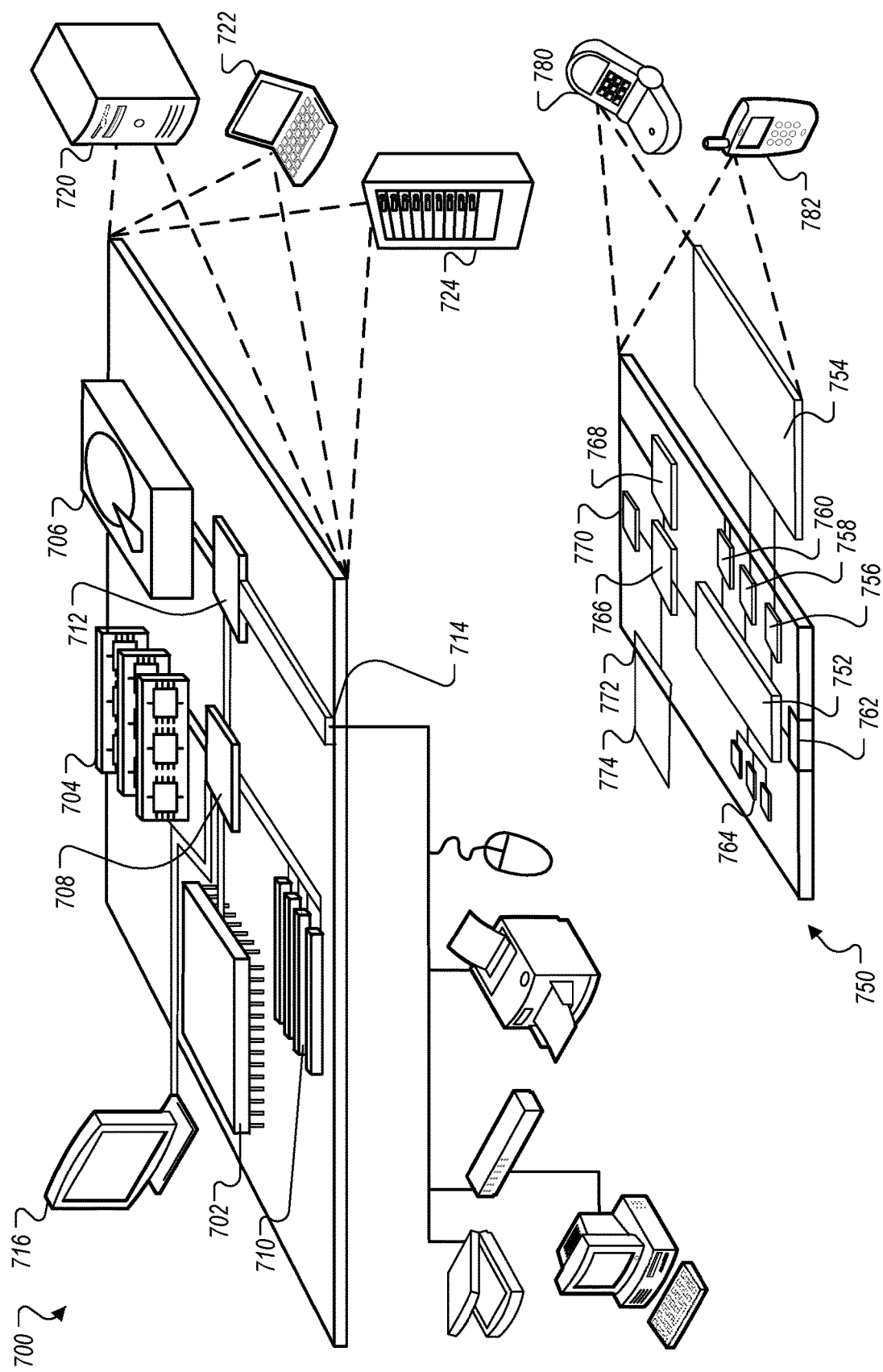
FIG. 7 is a block diagram of example computing devices that may be used to implement the systems and methods described in this document, as either a client or as a server or plurality of servers.

FIG. 7 is a block diagram of example computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 700 is further intended to represent any other typically non-mobile devices, such as televisions or other electronic devices with one or more processers embedded therein or attached thereto. Computing device 750 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 700 includes a processor 702, memory 704, a storage device 706, a high-speed controller 708 connecting to memory 704 and high-speed expansion ports 710, and a low-speed controller 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed controller 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of duties is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed bus 714. The low-speed bus 714 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms and/or virtualized, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as computing device 750. Each of such devices may contain one or more of computing devices 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The computing device 750 may also be provided with a storage device, such as a micro-drive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the computing device 750, such as control of user interfaces, applications run by computing device 750, and wireless communication by computing device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of computing device 750 with other devices. External interface 762 may provide, for example, for wired communication (e.g., via a docking procedure) or for wireless communication (e.g., via Bluetooth® or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to computing device 750 through expansion interface 772, which may include, for example, a subscriber identification module (SIM) card interface. Such expansion memory 774 may provide extra storage space for computing device 750, or may also store applications or other information for computing device 750. Specifically, expansion memory 774 may include instructions to carry out or supplement the processes described above, and may include secure information also. Thus, for example, expansion memory 774 may be provided as a security module for computing device 750, and may be programmed with instructions that permit secure use of computing device 750. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Computing device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 768 (e.g., a radio-frequency transceiver). In addition, short-range communication may occur, such as using a Bluetooth®, WiFi, or other such transceiver (not shown). In addition, GPS receiver module 770 may provide additional wireless data to computing device 750, which may be used as appropriate by applications running on computing device 750.

Computing device 750 may also communicate audibly using audio codec 760, which may receive spoken information from a user and convert it to usable digital information. Audio codec 760 may likewise generate audible sound for a user, such as through a speaker, e.g., in a handset of computing device 750. Such sound may include sound from voice telephone calls, may include recorded sound (e.g., voice messages, music files, etc.) and may also include sound generated by applications operating on computing device 750.

The computing device 750 may be implemented in a number of different forms, as shown in the figure. For example, it may be implemented as a cellular telephone 780. It may also be implemented as part of a smartphone 782, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
assessing wireless sensors in the vicinity of a wireless security system that serves as a gateway for, at least, a plurality of known wireless sensors, wherein the gateway is used to identify one or more unknown wireless sensors for which there is no mechanism within the wireless security system for identification of the one or more unknown wireless sensors, the assessing including:
operating the wireless security system in a listen mode to receive and record a sequence of wireless transmissions produced by one or more unknown wireless sensors producing wireless transmissions in the vicinity of the wireless security system; and
evaluating the recorded sequence of wireless transmissions using a rule set that embodies normal operating characteristics of various types of wireless sensors in an operating environment; and
generating, based on the assessing, a conclusion regarding at least one attribute of at least one of the unknown wireless sensors that produced the recorded sequence of wireless transmissions.

2. The method of claim 1 wherein the generated conclusion is used in a process to enroll the at least one of the unknown wireless sensors into the wireless security system.

3. The method of claim 1 wherein generating the conclusion includes determining a probable assessment of a type of sensor for one of the at least one unknown wireless sensors.

4. The method of claim 1 wherein:
the wireless security system serves as the gateway between the known wireless sensors and a user interface device of the wireless security system, and
the assessment of the at least one of the unknown wireless sensors in the wireless security system includes presenting on the user interface device information related to the probable assessment regarding at least one of the: type of sensor, sensor function, sensor use case, or other attribute for the at least one of the unknown wireless sensors.

5. The method of claim 4 wherein the assessment of the at least one of the unknown wireless sensors in the wireless security system further includes receiving information from a user in response to presenting information to the user.

6. The method of claim 1 further comprising receiving preliminary information regarding the unknown wireless sensors in the vicinity of the wireless security system, the preliminary information including less information than is required to fully utilize the unknown wireless sensors in the wireless security system.

7. The method of claim 6 wherein the received preliminary information is input provided by a user.

8. The method of claim 6, wherein the received preliminary information is input from an information source.

9. The method of claim 1, wherein the conclusion is provisional, and the conclusion is changed or further refined using further information.

10. The method of claim 9, wherein the further information is derived from further assessments.

11. The method of claim 9, wherein the sensor is utilized in the wireless security system while the wireless security system is operating in a normal mode.

12. The method of claim 1 further comprising using the generated conclusion to utilize the at least one of the unknown wireless sensors in the wireless security system.

13. A method comprising:
programming a wireless security system that serves as a gateway for, at least, a plurality of known wireless sensors in the vicinity of the wireless security system, wherein the gateway is used to identify unknown sensors for which there is no mechanism within the wireless security system for identification of the unknown sensors, the programming including:
operating the wireless security system in a listen mode to receive and record a sequence of wireless transmissions produced by one or more unknown wireless sensors producing wireless transmissions in the vicinity of the wireless security system;
evaluating the recorded sequence of wireless transmissions using a rule set that embodies normal operating characteristics of various types of wireless sensors in an operating environment;
generating, based on the evaluating, a conclusion regarding a probably preferred attribute or behavior of the wireless security system; and
using the generated conclusion to program responses of the wireless security system.

14. The method of claim 13, wherein the conclusion is provisional, and the conclusion is changed or further refined using further information.

15. The method of claim 14, wherein the further information is derived from further assessments.

16. The method of claim 14, wherein the sensor is utilized in the wireless security system while the wireless security system is operating in a normal mode.

17. A wireless security system with one or more processors and memory, the memory storing a downloaded premises security system interface and a control application that is executable by the one or more processors of the security system, the wireless security system comprising:
a wireless transceiver configured to receive signals generated by known wireless sensors;
a user interface device configured to display information and receive user inputs from a user of the system;

a discovery rule set rule set storing information that embodies normal operating characteristics of various types of wireless sensors in an operating environment of the security system;

an enrolled sensors data store storing information for sensors that are enrolled in the security system, the information including sensor identifiers, sensor types, and sensor locations;

a sensor configuration data store storing communication information including communication protocol information; and a wireless application discovery program configured to perform operations including:

assessing unknown wireless sensors in the vicinity of the wireless security system that serves as a gateway for, at least, the known wireless sensors, wherein the gateway is used to identify new sensors for which there is no mechanism within the wireless security system for identification of the new sensors, the assessing including:

operating the wireless security system in a listen mode to receive and record a sequence of wireless transmissions produced by one or more of the unknown wireless sensors producing wireless transmissions in the vicinity of the wireless security system; and evaluating the recorded sequence of wireless transmissions using the rule set; and generating, based on the assessing, a conclusion regarding at least one attribute of at least one of the unknown wireless sensors that produced the recorded sequence of wireless transmissions.

18. The wireless security system of claim 17 wherein the generated conclusion is used in a process to enroll the at least one of the unknown wireless sensors into the wireless security system.

19. The wireless security system of claim 17 wherein generating the conclusion includes determining a probable assessment of a type of sensor for one of the at least one of the unknown wireless sensors.

20. The wireless security system of claim 17 wherein:

the wireless security system serves as the gateway between the known wireless sensors and a user interface device of the wireless security system, and the assessment of the at least one of the unknown wireless sensors in the wireless security system includes presenting on the user interface device information related to the probable assessment regarding at least one of the: type of sensor, sensor function, sensor use case, or other attribute for the at least one of the unknown wireless sensors.

\* \* \* \* \*